(12) United States Patent
Plante

(10) Patent No.: US 7,506,181 B2
(45) Date of Patent: Mar. 17, 2009

(54) CREATION OF HYBRID POWER MANAGEMENT STATES

(75) Inventor: Stephane G. Plante, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 496 days.

(21) Appl. No.: 11/096,864

(22) Filed: Apr. 1, 2005

(65) Prior Publication Data

US 2006/0224905 A1 Oct. 5, 2006

(51) Int. Cl.
*G06F 1/00* (2006.01)

(52) U.S. Cl. ..................................... 713/300

(58) Field of Classification Search .................. 713/300
See application file for complete search history.

(56) References Cited

U.S. PATENT DOCUMENTS

| | | | | |
|---|---|---|---|---|
| 6,131,166 A | * | 10/2000 | Wong-Insley | 713/300 |
| 6,499,102 B1 | * | 12/2002 | Ewertz | 713/1 |
| 6,751,561 B2 | * | 6/2004 | Oh | 702/60 |

OTHER PUBLICATIONS

Advanced Configuration and Power Interface Specification, *Intel, Microsoft, Toshiba*, www.acpi.info, Revision 1.0 b, Feb. 2, 1999, 1-397.

* cited by examiner

*Primary Examiner*—Thomas Lee
*Assistant Examiner*—Mohammed H Rehman
(74) *Attorney, Agent, or Firm*—Woodcock & Washburn LLP

(57) ABSTRACT

A base ACPI power management state is selected and a feature of a power management state that is to be created is defined. The definition of the power management state to be created is attached to an object of the base ACPI power management state in an ACPI namespace.

16 Claims, 3 Drawing Sheets

205

CREATION OF HYBRID POWER MANAGEMENT STATES

FIELD OF THE INVENTION

This invention relates to the field of computer power management and in particular to power management states.

BACKGROUND OF THE INVENTION

The Advanced Configuration and Power Interface (ACPI) specification is a document that describes ACPI hardware interfaces, ACPI software interfaces and ACPI data structures that, when implemented, enable support for robust operating system (OS)-directed configuration and power management. By using the ACPI specification, various computer systems and components that handle or implement power management states may be made compatible, even if such components are provided by different manufacturers.

Versions 1.0 and beyond of the ACPI specification define a well-known and widely-used set of power management states. State S0 is the "working" state for a computer system, wherein the computer's hardware is generally receiving full power. States S1-S3 are different levels of "sleeping" states where power to certain components is reduced, and context information required to return the system to the S0 state is stored in system RAM. State S4 is a "hibernate" state where the system is largely powered down, and where the context information required to return the system to the S0 state is stored in a hibernation file on some form of non-volatile storage (e.g., hard disk, NVRAM, etc.). State S5 is the "off" state where no context information is kept and the operating system must "boot" in order for the computer to return to the S0 state.

According to the ACPI specification, implementation of a particular system state requires that an object designating the power state exist at the root of the ACPI namespace. The object has the name _Sx, where x is from 1 to 5, thereby referring to the sleep and off states provided by the ACPI specification. For example, \_S3 corresponds to the S3 state. In addition, each object contains a DWORD having 4 bytes, where 2 bytes are reserved, 1 byte represents the command for a PM1a control register and 1 byte represents the command for a PM1b control register. For an operating system to transition the system to a sleep or off system state, the operating system writes the above-mentioned bytes to the appropriate register(s).

While the system state management provided by the ACPI specification is adequate for transitioning a system between any of the above-discussed power management states, it is severely limited in its ability to permit a developer to create new system states or to modify existing states. Developers may wish to design new system states that are a combination of existing states (e.g., a combination of S3 and S4), or a system state that is entirely new. In such a manner, power management can be tailored to advances in device and software development. The current ACPI system state naming scheme (i.e., the namespace) is unable to adequately provide for such new system states, however.

For example, the names of the ACPI states (e.g., S0-5) have a predefined meaning and provide an ordering mechanism to the operating system that the operating system uses to search for the most appropriate state when a system state transition is to occur. As a result, no room has been left in the ACPI system state namespace to add new system states. In addition, the meaning of the ACPI system state must be built into the software that references the state. In other words, the name of the state (e.g., "S3") conveys information to the software instead of any data contained within the ACPI object. Thus, if a developer created a new system state, any software that is to use the system state would have to be updated. With the widespread proliferation of computer systems and software applications, such a solution would be cumbersome and time-consuming. Even if creating new system states (and updating all software that use the new states) were practical, the current ACPI naming scheme, or namespace, could only accommodate 250 new states (i.e., \_S6_to \_SFF), which may not be sufficient for the wide variety of devices and applications that are available currently and in the future.

The ACPI namespace is also limited by a developer's inability to add additional data to an existing _Sx object, because such an object contains a single DWORD. Other than 16 reserved bits within the DWORD that are too small to be of practical value, the object does not contain extra storage space for additional information. Furthermore, the data type of the DWORD cannot be changed without rendering the changed object incompatible with legacy ACPI-compliant operating systems.

Accordingly, there is a need for a mechanism for enabling power management states that are not supported by the ACPI specification while maintaining interoperability with systems that adhere to the specification. The present invention satisfies this need.

SUMMARY OF THE INVENTION

In view of the foregoing shortcomings and drawbacks, a method and computer readable media are provided herein. In the method, a base ACPI power management state is selected and a feature of a power management state that is to be created is defined. The definition of the power management state to be created is attached to an object of the base ACPI power management state in an ACPI namespace.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Example Computing Environment

Figure 1:
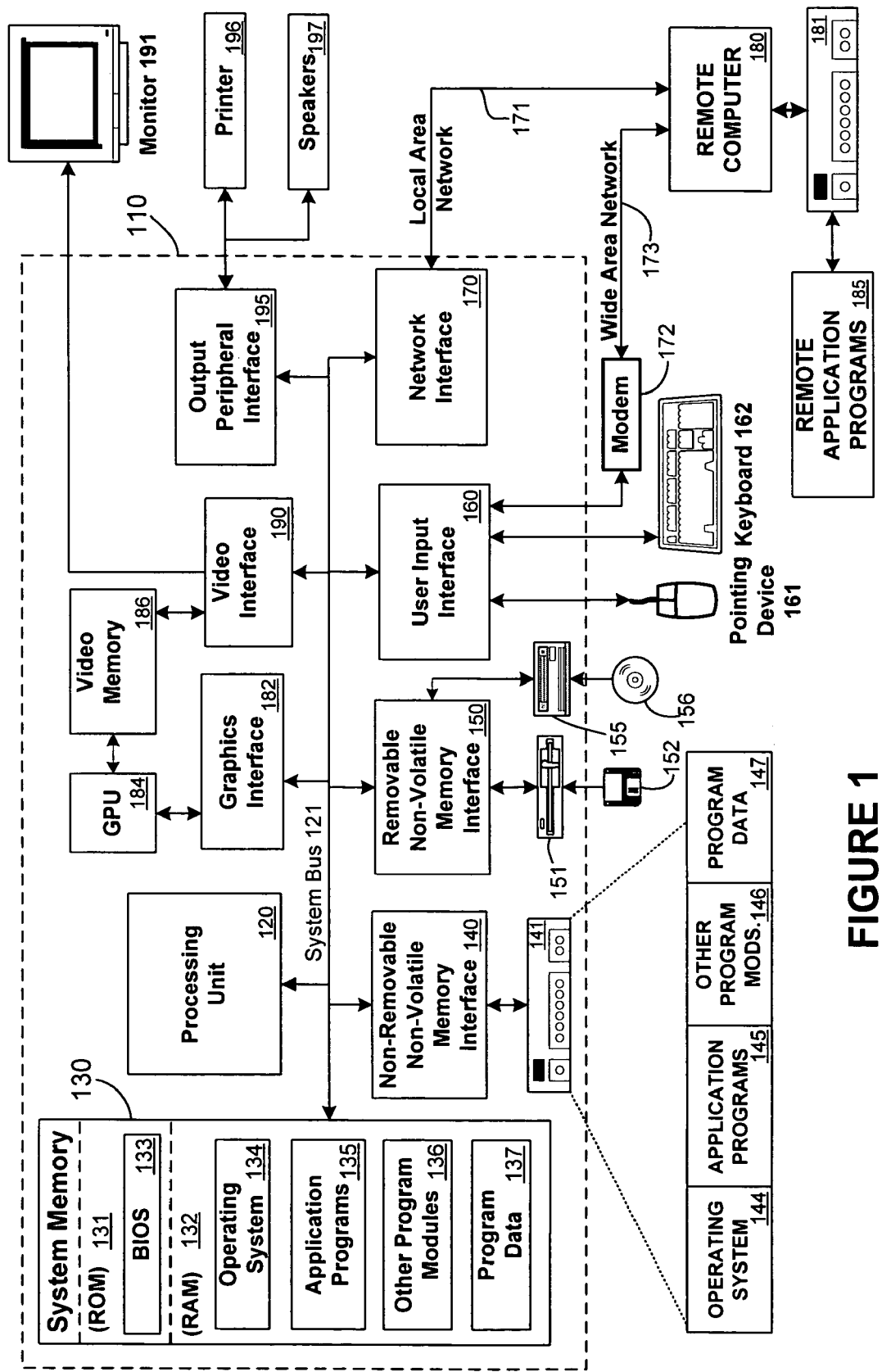
FIG. 1 is an example computing environment in which aspects of the present invention may be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the example operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. Typically the functionality of the program modules may be combined or distributed as desired in various embodiments. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an example system for implementing the invention includes a general purpose computing device in the form of a computer 110. Components of computer 110 may include, but are not limited to, a processing unit 120, a system memory 130 and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read-only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146 and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are example and other means of establishing a communications link between the computers may be used.

Example Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While example embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Example Embodiments

As noted above, conventional, ACPI specification-compliant systems are limited to the S0-5 power management states that are described in the ACPI specification because of the numerous limitations imposed by the ACPI namespace. Power management states having features differing from the ACPI system states discussed above are not supported. An attempt to create a modified power management state that deviates in some way from the proscribed ACPI states, or to redefine the existing states, would therefore not be compatible with such legacy ACPI-compatible systems unless software modifications are made to such systems, which is undesirable.

Accordingly, an embodiment encodes a system state property as part of the data within a power management state object instead of within the object's name. In addition, an embodiment may operate in connection with an entity that controls the meaning of the property encoding and is responsible for adding whatever new information is required to effectuate the property in a manner that does not conflict with legacy ACPI-compatible systems.

An embodiment also provides at least one "hybrid" power management state that is described in the ACPI namespace as part of an ACPI power management state object. The hybrid power management state may be, in such an embodiment, described in terms of an ACPI "base" power management state and one or more information elements that indicate features that are present in the ACPI base state. Thus, the information that defines the capabilities of the hybrid state may be encoded within the ACPI power management state object, rather than in the name of the ACPI state object. As a result, a very large number of hybrid states may be defined. As may be appreciated, the number of hybrid states may be limited by such factors as limitations specified by the ACPI specification (e.g., length of strings, buffers and the like), computer hardware limitations and the like.

To provide a hybrid power management state, an embodiment may provide a single entity that is responsible for all parts of the system state property encoding. If new fields for new properties are to be added to the encoding, for example, then the entity may add more space to the end of the encoding. For example, if a company wishes to add a new hybrid state property that requires 4 bytes of data, it can ask a controlling entity to add 4 bytes to the definition of the encoding. The controlling entity can do so and then release the definition of the encoding. Any application or the like that cares about the feature the company added can scan the system's hybrid power states and look for objects having that are long enough to support the state and then extract the necessary information from each individual state, for example. Also, any new property added to the encoding may have a value reserved for "off," "not present" or the like. The entity may be any software component that is able to perform such functions such as, for example, an application program interface (API), software module or the like.

In addition, it will be appreciated that by using the ACPI namespace, existing power management state definitions may remain unchanged, which allows a system with a hybrid state to remain compatible with a legacy, ACPI-compliant operating system.

Embodiments of the invention allow for numerous naming schemes that may be selected to enable a system's operating system to recognize that such hybrid power management states are available and for a system's BIOS to communicate that such states are available to the operating system and to other system components. Thus, it will be appreciated that the naming schemes discussed herein are merely illustrative for purposes of explanation, as other naming schemes are consistent with an embodiment.

To enable the above-mentioned hybrid power management states, according to an embodiment, the existing ACPI power management namespace is used in such a way as to provide an abstract power management state naming scheme that permits the enumeration of hybrid power management states. In such an embodiment, therefore, components that are already provided by the ACPI specification are leveraged to provide functionality (i.e., flexible power management state definitions) that was not originally contemplated by the ACPI specification. In addition, because an embodiment leverages such pre-existing components, legacy operating systems and software applications that are ACPI compliant are still able to run on systems that have been modified to have such hybrid power management states. It will be appreciated that a future version of the ACPI specification may incorporate one or more new or modified features that may enable an embodiment to provide such a hybrid state in a more streamlined fashion, and any such features are equally compatible with an embodiment.

In the discussion that follows, it is assumed that one skilled in the art understands the operation and syntax of the ACPI power management state namespace and the programming conventions used therein. Accordingly, such details are omitted herein for clarity.

Figure 2:
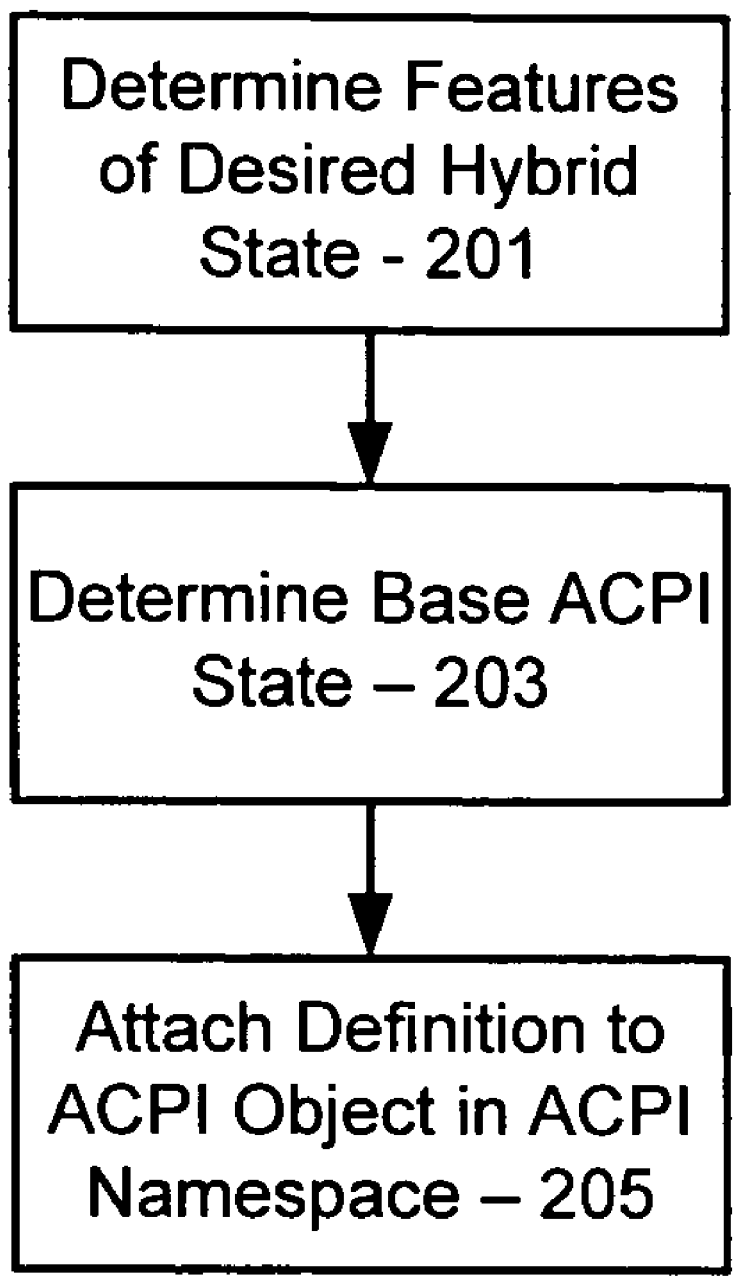
FIGS. 2-3 are flowcharts illustrating an example method of creating a hybrid power management state in accordance with an embodiment of the present invention.

Turning now to FIG. 2, an example method 200 of creating a hybrid power management state in accordance with one embodiment is presented. In method 200, a developer or the like may determine the features a desired hybrid power management state is to have and then can implement the hybrid power management state by using existing ACPI features.

At step 201, therefore, the features a desired hybrid power management state is to have are determined. It will be appreciated that such features may be a combination of features already present in pre-existing ACPI power management states, may be new features that are not currently supported by the ACPI specification, or the like. Such features, in an embodiment, may be limited only by the capabilities of the operating system or device in which the hybrid power state will be used, for example.

Figure 3:
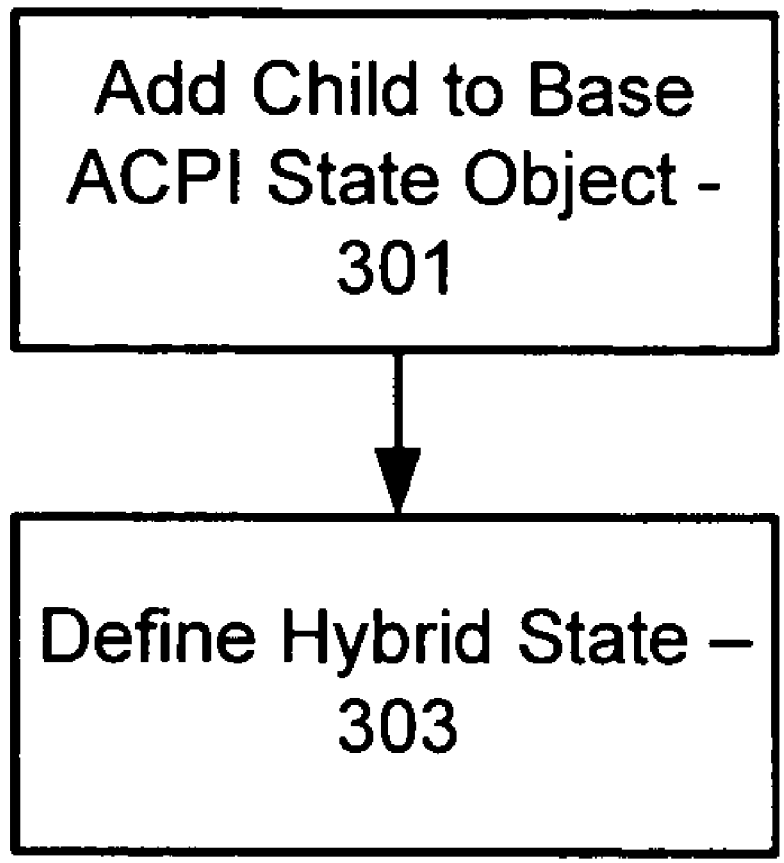

At step 203, a base ACPI state is determined. The base ACPI state, in an embodiment, may be used as a type of "template" from which changes or features are added or subtracted to form the hybrid power state. The determination of the proper base ACPI state may use any number and type of considerations. For example, it will be appreciated that in some embodiments it will be most efficient to use a base ACPI state that most closely resembles the hybrid power management state so the amount of additional information that needs to be used to describe the hybrid power state, as discussed below in connection with step 205 and FIG. 3, is minimized.

As will be seen below, an embodiment provides that the features of such a hybrid power state may be defined as a hybrid version of an existing power state. It will be appreciated that systems that are to enable such a hybrid power state may need to be updated in order to understand the hybrid state. However, it will also be appreciated that a system that has not been updated (e.g., a legacy system) will view a hybrid state as the hybrid state's base ACPI state.

As may be appreciated, independent developers may define new hybrid states in an arbitrary and possibly incompatible fashion. In order to maintain compatibility between systems, therefore, some entity may maintain a list of hybrid state definitions. Thus, an embodiment may be used in connection with a new or modified standard.

A base ACPI state may be selected to be the state that matches the most deeply-hibernating component or the like of the system in the hybrid power management state. It will be appreciated that context information may be used to return the system to a fully-operational on state (e.g., S0 or the like) or to another hybrid or ACPI power management state. Generally, the deeper the hibernation (or "sleep") state, the more context information is stored. In addition, the type of storage medium in which the context information is stored tends to become more permanent as the sleep state becomes more deep. For example, a standby state may have context information that is stored in RAM, while a more deep hibernate state may have context information that is stored on a hard drive. Thus, if a hardware or software component will be in a "deep" sleep when in the hybrid power management state, and the base ACPI state is selected to be a relatively "light" sleep, sufficient context information for the component may not be stored, or context information for the component may be stored in an inadequately permanent storage medium. It will be appreciated that, in some embodiments, multiple ACPI states may be used as the base ACPI state, and that operational or other considerations may dictate the appropriate ACPI state to use as the base ACPI state.

Once the base state has been determined in step 203, the definition of the hybrid state is attached to a base ACPI state's ACPI object in the ACPI namespace at step 205. It will be appreciated that an embodiment permits a hybrid state definition to be attached to an ACPI state object that does not correspond to the hybrid state's base ACPI state. However, for reasons of clarity and organization an embodiment provides that a hybrid state definition may be attached to an ACPI state object that corresponds to the hybrid state's base ACPI state. Attaching the definition of the hybrid power management state to the base ACPI state's object in the ACPI namespace, as will be discussed below in connection with FIG. 3, enables an embodiment to provide hybrid power management states to new systems, as well as legacy, ACPI-compliant systems.

Turning now to FIG. 3, a detail of step 205 discussed above in connection with FIG. 2 is illustrated. In FIG. 3, at step 301, a child is added to the base ACPI state's object in the ACPI namespace. According to one embodiment, children of an ACPI object may be numbered sequentially starting at "0000" (hexadecimal), if no other children of the APCI object exist. If other children of the ACPI object exist, another number (e.g., the next sequential hexadecimal number or the like) may be selected. Accordingly, an example system that supports the S1, S3, S4 and S5 states, as well as two hybrid states may have a namespace that may look like, for example:

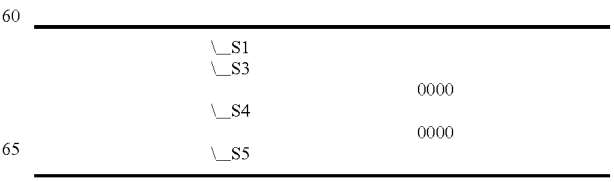

It will be appreciated that, due to limitations in the APCI namespace, there may exist a maximum number of hybrid states (i.e., children objects) each ACPI object may have. For example, a maximum number of hybrid states that each ACPI object may have could be, for example, 216. It will be appreciated that future versions of the ACPI specification may permit a greater number of children to be attached to a particular ACPI object, and that any number of permissible children is consistent with an embodiment. Even in cases where the ACPI namespace limits the number of children an APCI object may have, if more hybrid states are required an embodiment provides that such a hybrid state may be attached as a child of a hybrid state (i.e., a child of a child of the ACPI object), which allows for a theoretically infinite number of hybrid states, within any storage limitation of the ACPI specification and/or the system. Such an example namespace may look like, for example:

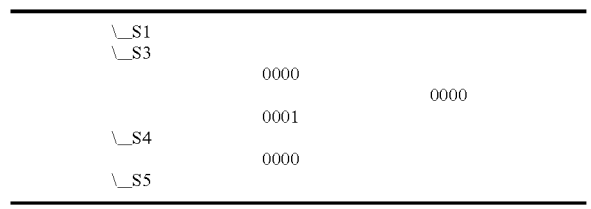

As can be seen above, the S3 state has two hybrid states, "0000" and "0001." The "0000" hybrid state also has a "0000" hybrid state encoded in a child object. It will be appreciated that the second "0000" object may have some relation to the parent "0000" object, such as for example being a further-refined hybrid power state definition of the parent. Alternatively, for example, the object may have no relationship other than the parent-child relationship imposed by the ACPI namespace. Once the name (i.e., number) of the hybrid state is chosen in step 301, the definition of the hybrid state may be provided in step 303. It will be appreciated that the definition of a hybrid power management state may contain, for example, a sleep command value for a particular system component or the like. According to an embodiment, the definition may take the form of a package, string, array or buffer data type, or any type of fixed or variable length data structure. By using such data types, new elements may be added without interfering with previously-available functionality. For example, package, string, array and buffer data types are defined in the ACPI specification such that all share the property that the number of elements are precisely defined and easily obtainable by the operating system. As a result, the operating system is able to know exactly which elements are present in the definition of the hybrid state. It will be appreciated that by using the data types of the ACPI specification that are defined in such a manner, an embodiment is able to provide the new functionality of a hybrid power management state to a legacy ACPI-compliant system. Such a legacy ACPI-compliant system therefore need only be updated with the hybrid state definitions to enable such hybrid state definitions to be implemented by the system.

It will also be appreciated that any type or configuration of naming convention may be used in accordance with an embodiment. For example, the actual content of the hybrid power management state definition may take any form that is compatible with the ACPI specification as was discussed above in connection with appropriate data types. An embodiment permits such flexibility because, in such an embodiment, the ACPI BIOS and the operating system both ascribe the same meaning to the elements contained within the hybrid power management state definition.

For purposes of explanation, several non-limiting examples of possible naming conventions that may be used in connection with an embodiment are presented. For example a naming convention may take the form of:

\_S1.0000, \_S1.0001, \_S3.0000, \_S3.0000.0000

In this convention, the leaf node objects "0000" and "0001" are present at different scopes under the well-defined \_Sx objects. These leaf node objects are hybrid states for the parent \_Sx object. It will be appreciated that \_S3.0000 and \_S3.0000.0000 are different objects.

In another example naming convention:

\_xxx.0000, \_xxx.0001, \_xxx.0002, \_xxx.0000.0000, \_xxx.0001.0000

It can be seen that this example is similar to the previous example, but instead of the root-level object having some significance, objects may be attached to some well-defined root level object that has no particular significance other than providing a convenient place for search for hybrid power states.

In yet another example naming convention:

\_SB.xxxx.yyyy.zzzz=HybridPowerState( . . . )

In this example the ACPI language itself may be extended to provide a new object type. That is, a BIOS may create a new hybrid power state by using a process that is similar to declaring an Integer, String, Device, Thermal Zone, etc. These objects could, in an embodiment, be created anywhere in the namespace, and could be detected by scanning through the namespace and searching for all objects of the appropriate type. Alternatively, the objects could be detected by receiving a notification from an interpreter as to when the objects are created. This process is similar to detecting an enumerating device in the ACPI namespace.

As an illustrative, non-limiting example using the namespace of revision 3.0 of the ACPI specification, a hybrid power management state definition need only contain bytes that should be written to the PM1 control registers to transition the system to the hybrid state. As may be appreciated, future releases of the ACPI specification may replace the PM1 control register with another mechanism, but any such mechanism is equally consistent with an embodiment.

Continuing to use revision 3.0 of the ACPI specification as an illustrative, non-limiting example, each of the PM1 control registers that control a system state may be 3 bits wide and cannot be expanded without becoming inconsistent with legacy operating systems. Thus, the ACPI namespace has an effective limit of 64 different values that can be written as a sleep command value. An embodiment provides a mechanism for expanding the number of sleep command vales that can be stored in the ACPI namespace while remaining consistent with legacy operating systems. According to such an embodiment, another register may be defined—using pre-existing ACPI mechanisms so as to retain compatibility with legacy operating systems—to act as a secondary command value. Because the BIOS defines the values that the operating system writes to the PM1 control register, the BIOS can define a value that indicates that the BIOS should obtain the real command from the secondary command register. Accordingly, the use of secondary command values in the ACPI namespace permits a developer or the like to use pre-existing ACPI features in a manner that permits additional sleep command values, even though the ACPI features used may not have been designed with that purpose in mind. In addition, an embodiment's use of secondary command values can also be used if, for example, the system's chipset does not support the PM1b control register, which would otherwise limit the number of unique sleep command values to 8.

As an illustrative, non-limiting example for purposes of explanation, consider a system that supports the S1, S3, S4 and S5 ACPI power management states (in addition to the S0 "on" state) as well as 8 hybrid states according to an embodiment. The example system only has 1 PM1 control register. An example package definition may take the form:

```
Package( ) {
    PM1_Ctrl_Value,         // Integer
    PM3_Ctrl_Value,         // Integer
    Option 1,               // Integer
    Option 2,               // String
    ...,                    // ...
    Option N,               // ...
}
```

The PM3_Ctrl_Value noted above may be a name given to the secondary command register previously discussed. To further explain the flexibility an embodiment provides, it will be appreciated that the Option 1 through N parameters may take any form and have any meaning so long as the operating system and the BIOS define the parameters consistently. Thus, an example namespace according to an embodiment may be illustrated as:

Name(_S1, 1)
Name(_S3, 2)
Name(_S3.0000, Package( ) {5, 1, 0})
Name(_S3.0001, Package( ) {5, 2, 1})
Name(_S3.0002, Package( ) {5, 3, 0, 1})
Name(_S3.0003, Package( ) {5, 4, 1, 1})
Name(_S4, 3)
Name(_S4.0000, Package( ) {6, 1, 0})
Name(_S4.0001, Package( ) {6, 2, 1})
Name(_S4.0002, Package( ) {6, 3, 0, 1})
Name(_S4.0003, Package( ) {6, 4, 1, 1})
Name(_S5, 4)

It can be seen from the above example that the S3 and S4 power management state objects are each the base ACPI state objects for four hybrid power management states. It will also be appreciated that in the above example, the values 5 and 6 in the PM1a Control Register may indicate to the system BIOS to read additional information from the PM3 Control Register. As a result, a system that uses the above example has a total of 12 power management states (S1, S3, S4 and S5, plus 8 hybrid states) while using an otherwise conventional ACPI namespace. As can therefore be appreciated, an embodiment of the invention provides a mechanism by which an ACPI namespace can be used to a provide power management state (hybrid state) that was otherwise unsupported by the ACPI specification while remaining consistent with legacy, ACPI-compliant operating systems.

While the present invention has been described in connection with the preferred embodiments of the various figures, it is to be understood that other similar embodiments may be used or modifications and additions may be made to the described embodiment for performing the same function of the present invention without deviating therefrom. For example, it should be emphasized that a variety of computer platforms, including handheld device operating systems and other application specific operating systems are contemplated, especially as the number of wireless networked devices continues to proliferate. Furthermore, the present invention may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed:

1. A method of creating a hybrid power management state (hybrid state) in addition to a set of power management states specified in an Advanced Configuration and Power Interface (ACPI) namespace, comprising:

selecting, from the set of power management states, a base state having base features to define the hybrid state;

defining the hybrid state as a combination of the base features and a hybrid feature that changes a feature of or adds a feature to the base features; and creating the hybrid state in the ACPI namespace as a power management state in addition to the set of power management states.

2. The method of claim 1, wherein said creating step comprises adding the hybrid state as a child to a base state object.

3. The method of claim 1, wherein the base state is the ACPI state in the set of power management states having the most common features with the hybrid state.

4. The method of claim 1, wherein the base state is a sleep state that corresponds to a sleep state associated with the hybrid feature.

5. The method of claim 1, wherein the definition of the hybrid feature in the hybrid state has a package, string, array or buffer data type.

6. The method of claim 1, wherein the hybrid feature has a sleep command value and wherein the method further comprises determining the sleep command value.

7. The method of claim 6, wherein the sleep command value is determined from the definition of the hybrid state.

8. The method of claim 6, wherein the definition of the hybrid state references a secondary command value to enable the hybrid feature.

9. A computer-readable storage medium having computer-executable instructions for performing a method of creating a hybrid power management state (hybrid state) in addition to a set of power management states specified in an Advanced Configuration and Power Interface (ACPI) namespace, the method comprising:

selecting, from the set of power management states, a base state having base features to define the hybrid state;

defining the hybrid state as a combination of the base features and a hybrid feature that changes a feature of or adds a feature to the base features; and creating the hybrid state in the ACPI namespace as a power management state in addition to the set of power management states.

10. The computer-readable storage medium of claim 9, wherein said creating step comprises adding the hybrid state as a child to a base state object.

11. The computer-readable storage medium of claim 9, wherein the base state is the ACPI state in the set of power management states having the most common features with the hybrid state.

12. The computer-readable storage medium of claim 9, wherein the base state is a sleep state that corresponds to a sleep state associated with the hybrid feature.

13. The computer-readable storage medium of claim 9, wherein the definition of the hybrid feature in the hybrid state has a package, string, array or buffer data type.

14. The computer-readable storage medium of claim 9, wherein the definition of the hybrid state has a sleep command value that enables the hybrid feature.

15. The computer-readable storage medium of claim 14, wherein the definition of the hybrid state references a secondary command value to enable the hybrid feature.

16. The computer-readable storage medium of claim 15, wherein the secondary command value corresponds to a control register.

* * * * *